(12) United States Patent
Dam

(10) Patent No.: US 7,997,149 B1
(45) Date of Patent: Aug. 16, 2011

(54) APPARATUS AND METHOD FOR NON-INVASIVE MEASUREMENT OF THE SOUND VELOCITY OF A FLUID FLOWING IN A TUBING

(75) Inventor: Naim Dam, Muttontown, NY (US)

(73) Assignee: Hema-Q, Inc., Muttontown, NY (US)

( * ) Notice: Subject to any disclaimer, the term of this patent is extended or adjusted under 35 U.S.C. 154(b) by 0 days.

(21) Appl. No.: 12/950,373

(22) Filed: Nov. 19, 2010

(51) Int. Cl.
*G01F 1/58* (2006.01)
(52) U.S. Cl. ............................................. 73/861.11
(58) Field of Classification Search ... 73/861.11–861.13
See application file for complete search history.

(56) References Cited

U.S. PATENT DOCUMENTS

| | | | | |
|---|---|---|---|---|
| 4,262,523 A | * | 4/1981 | Stansfeld | 73/24.05 |
| 4,622,202 A | * | 11/1986 | Yamada et al. | 376/246 |
| 7,838,296 B2 | | 11/2010 | Corey et al. | |

* cited by examiner

*Primary Examiner* — Jewel Thompson
(74) *Attorney, Agent, or Firm* — Gordon D. Coplein

(57) ABSTRACT

A method and apparatus for measuring the sound velocity of a flowing fluid includes a cartridge having a hollow interior through which the fluid flows formed by first and second chambers of different diameters that define first and second walls extending toward the cartridge longitudinal axis from which energy transmitted by a single sensor mounted in the cartridge is reflected back to the sensor. An electronic circuit includes a microprocessor that is programmed with the distance between the first and second walls and that measures the round-trip transit time of the signal energy transmitted to and reflected from each of the first and second walls and calculates the sound velocity of flowing fluid using the two measured round trip transit times and the programmed value of the fixed distance between the walls.

18 Claims, 2 Drawing Sheets

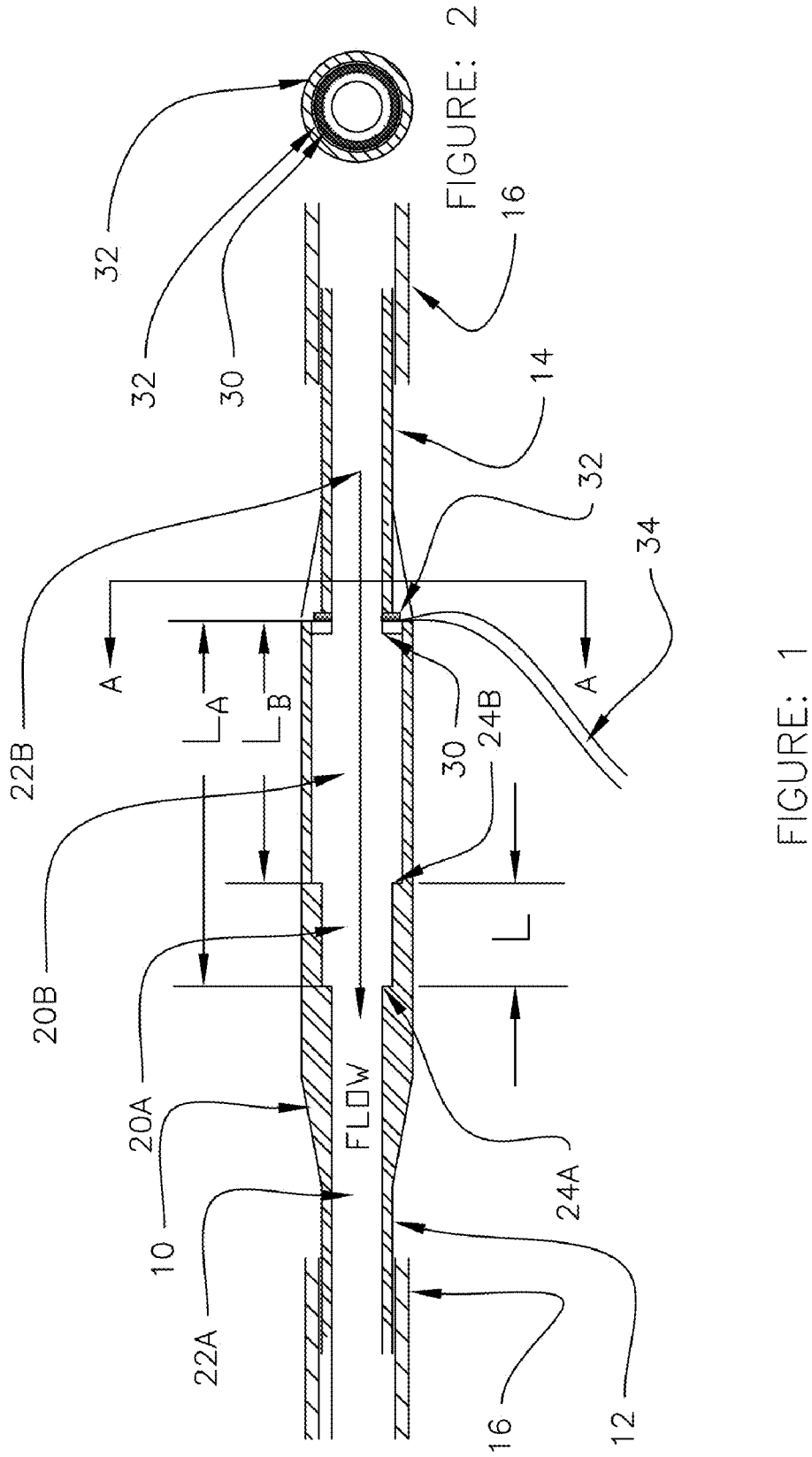

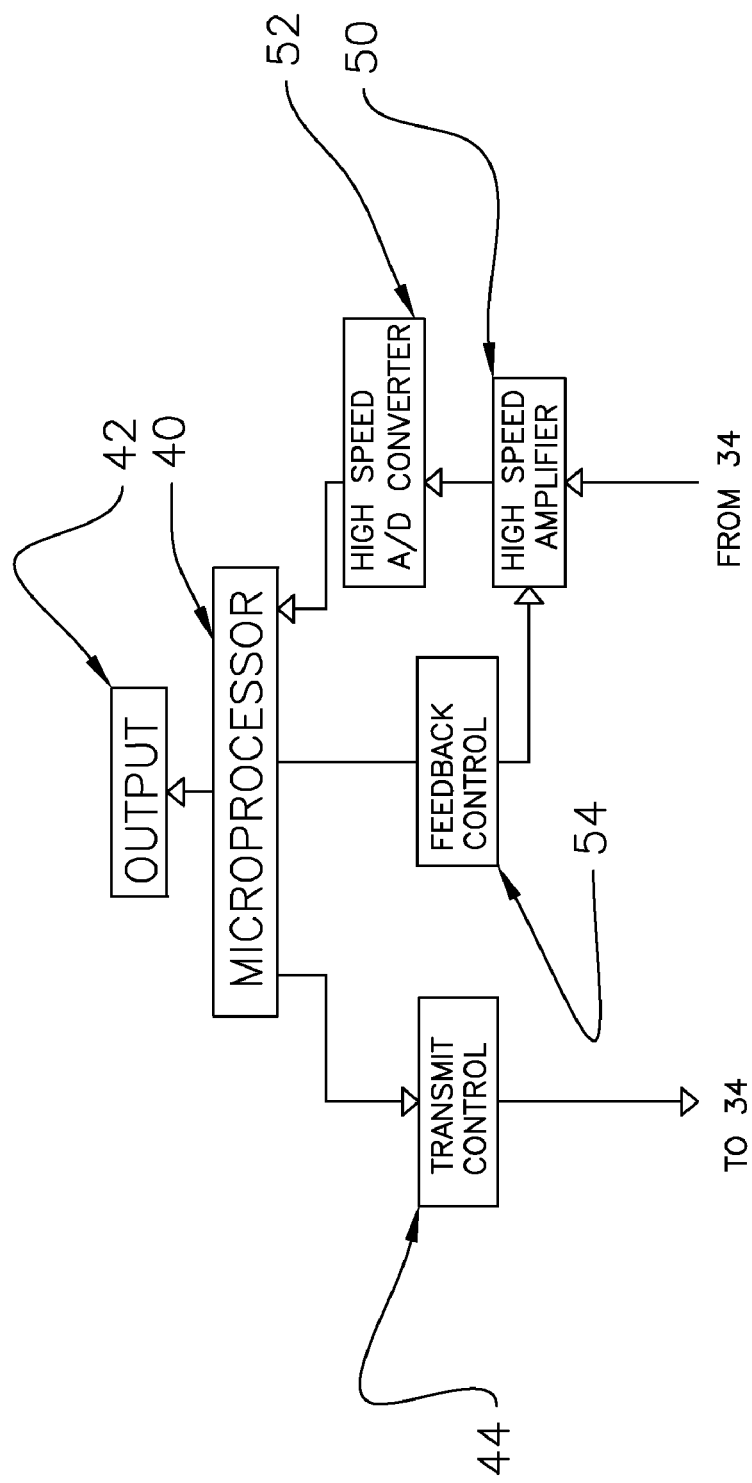
FIGURE: 3

US 7,997,149 B1

APPARATUS AND METHOD FOR NON-INVASIVE MEASUREMENT OF THE SOUND VELOCITY OF A FLUID FLOWING IN A TUBING

FIELD OF THE INVENTION

The present invention relates to an apparatus and method for non-invasively measuring the sound velocity of a fluid flowing in flexible or rigid tubing.

BACKGROUND OF THE INVENTION

The term "sound velocity" is a recognized shorthand expression describing a characteristic of the speed at which sound waves travel in a medium. The speed of sound varies depending on the medium through which the sound waves pass. It usually is a parameter used in describing properties of different substances or mediums. Knowing the value of the sound velocity of a particular medium, such as a flowing fluid, liquid or gas, permits many different characteristics or properties of the fluid to be determined. Using the sound velocity together with appropriate mathematical relationships allows for determination of various characteristics or properties of the medium such as its density, purity concentration, components of the medium composition, etc.

Several different types of apparatus exist for measuring the sound velocity in a fluid flowing in flexible or rigid tubing. The term "tubing" is used hereafter to define both the flexible, semi-rigid, and rigid type. Flexible tubing is of a material, such as an elastomeric, that can be deformed. Rigid tubing can be of any material such as plastic or metal and is not normally deformable. Semi-rigid tubing can be of a material other that an elastomeric that can be somewhat deformed.

Apparatus for measuring sound velocity is generally of either the contact or non-invasive type. In the contact type, some part or parts of the measuring apparatus come into direct contact with the fluid. In the non-invasive type, the sound velocity is measured without any part of the measuring apparatus coming into contact with the fluid. Whatever apparatus is used for measuring the sound velocity, it is desired that it be as simple in construction and operation as possible and that it does not adversely hinder or affect the application or other apparatus with which it is being used.

BRIEF DESCRIPTION OF THE INVENTION

In accordance with the invention, an apparatus is provided to measure sound velocity in a fluid flowing in either elastic, semi-rigid or rigid tubing that is in-line with the tubing and which can operate on a continuous basis. In the invention, a capsule or cartridge is provided that is placed in the tubing line. That is, the cartridge is between two ends of the tubing and the fluid flows from one end of the tubing, through the cartridge and into the other tubing end to its ultimate destination. The cartridge has a generally cylindrical with two internal chambers of different diameters through which the fluid flows. The two different internal chamber diameters form two walls spaced apart by a fixed distance that are generally transverse to the cartridge longitudinal axis, which is the direction of the fluid flow. The two walls define reflecting points for a signal of ultrasonic energy.

The cartridge has a single transducer, or sensor, for transmitting and receiving the ultrasonic signal under control of a microprocessor. The apparatus operates using a pulse echo technique in which the round-trip transit time of the signal transmitted by the sensor to each of the two reflecting walls and reflected back to the sensor is measured. The microprocessor operates to make the two round-trip transit times measurements and uses these together with the known value of the distance between the two reflecting walls to calculate the sound velocity of the flowing fluid.

The cartridge of the invention used in making the sound velocity measurement is relatively inexpensive. Therefore, it can be part of a disposable tubing set used in a sterile application, such as in a medical procedure. The cartridge can be adapted to be utilized with any one of flexible, rigid or semi-rigid tubing of any type of material requiring only the appropriate arrangement for coupling ends of such tubing to the ends of the cartridge in a fluid type manner.

BRIEF DESCRIPTION OF THE DRAWINGS

Other objects and advantages of the present invention will become more apparent upon reference to the following specification and annexed drawings in which:

FIG. 1 is a plan view of the cartridge taken in cross section along its length;

FIG. 2 is an end view of the cartridge in cross section along the lines A-A of FIG. 1; and FIG. 3 is a block diagram of the electronic circuit used in conjunction with the cartridge to measure the sound velocity.

DETAILED DESCRIPTION OF THE INVENTION

Referring to FIGS. 1 and 2, the measuring cartridge 10 is shown. The cartridge exterior is of any desired shape and size. It has a first end 12 through which the fluid enters and a second end 14 through which the fluid exits. That is, the fluid flows in the direction of the tubing longitudinal axis. The fluid can be a liquid or a gas. Each of the cartridge ends 12 and 14 is shaped to accept the end of a tubing 16 or a suitable connector on the tubing end so as to be able to couple the flowing fluid into and out of the cartridge without leakage. Any suitable type of connector can be used for this purpose, depending upon the type and material of the tubing and the fluid. The cartridge can be any suitable material such as ABS, KYNAR, CPVC and TEFLON plastic materials. It also can be made of metals such as stainless steel, titanium, and nickle and can be formed of glass. The type of material used for the cartridge is compatible with the fluid that is to pass through it.

The hollow interior of the cartridge 10 has two generally cylindrical tubular sections or chambers 20A and 20B of different diameters, with the downstream section 20A having a smaller diameter than that of the upstream section 20B. These two internal sections 20A and 20B communicate with internal passages 22A and 22B at the cartridge ends 12 and 14 so that the fluid can flow freely through the cartridge interior along its longitudinal axis.

The cylindrical sections 20A and 20B form two walls 24A and 24B that are generally transverse to the cartridge longitudinal axis. The two walls 24A and 24B are spaced apart by a known fixed distance L. An ultrasonic transducer (sensor) 30, such as a piezoelectric crystal, is mounted at the upstream end of the cartridge hollow internal cylindrical section 20B adjacent to where the fluid enters the cartridge. The sensor 30 can be of any suitable material such as PZT and PVDF, as is well known in the art. As seen in FIG. 2, the sensor 30 is of toroidal shape. It is mounted on a base piece 32 of the same shape, but which is slightly larger, by a suitable adhesive to form an assembly of the two. The sensor 30 receives electrical signals from a source and converts these to electro-mechanical energy (ultrasonic) signals and transmits these along the length of the cartridge to the walls 224A and 24B. These electro-mechanical signals are reflected back to the sensor 30 which converts them to electrical signals. A pair of leads 34 extend from the sensor 30 so that electrical signals can be applied to it from a power source and to supply signals reflected from the walls 24A and 24B as electrical signals to an amplifier.

The assembly of the sensor 30 and base piece 32 are sealed into the cartridge. The cartridge can be manufactured in two longitudinal halves, such as by plastic molding or machining. The sensor 30 and base piece 32 are mounted to one of the halves which are then joined together and the exit for the leads 34 sealed to form a cartridge which is fluid tight to the fluid that flows through it.

In FIG. 1 the distance between the sensor 30 and the first internal wall 24A is designated LA and the lesser distance between the sensor 30 and the second internal wall 24B is designated LB. The distance between the two walls is designated L, which is known and fixed. The distances LA and LB from the sensor 30 to each of the two reflecting walls 24A and 24B also is known.

In operation of the apparatus, by a circuit described below, the sensor 30 transmits ultrasonic energy signals which are reflected from each of the walls 24A and 24B back to the sensor 30. The round-trip times for the signals will be different due to the different distances of the respective walls 24A and 24B from the sensor 30. The sound velocity V of the fluid flowing in the cartridge is calculated from the two measured round-trip transit times and the known fixed distance L between the two walls 24A and 24B. This is shown as follows:

$$ta = \frac{2LA}{V} \quad (1)$$

$$tb = \frac{2LB}{V} \quad (2)$$

where:
V is the sound velocity,
ta is the round trip transit time of the signal from the sensor to the first wall 24A,
tb is the round trip transit time of the signal from the sensor to the second wall 24B, and
L is the fixed known distance between the first and second walls 24A and 24B.
It can be seen that:

$$ta - tb = \frac{2(LA - LB)}{V} \quad (3)$$

Since LA−LB=L which is known, then $$ta - tb = \frac{2L}{V} \quad (4)$$

and $$V = \frac{2L}{ta - tb} \quad (5)$$

FIG. 3 is a block diagram of a circuit for use with the cartridge 10 for measuring the sound velocity of the fluid flowing in the cartridge. There is a microprocessor 40 that preferably has an internal memory. The microprocessor has an output 42 with any conventional type, such as a numeric display. The microprocessor 40 is programmed to activate a transmit control circuit 44 to periodically supply bursts of electrical signals at timed intervals to the sensor 30 over the leads 34. The transmit control circuit 44 can be a continuously running signal generator and power amplifier that is gated open by the microprocessor at the time intervals to supply bursts of pulses to the sensor 30. Alternatively, the microprocessor can activate the transmit control circuit 44 at the appropriate times to supply the pulse signal bursts to sensor 30.

The bursts of pulses that the sensor receives from the transmit control circuit 44 are converted to electro-mechanical energy and transmitted by the sensor 30 to be reflected back to the sensor from the walls 24A and 24B. The sensor converts the reflected received energy signals to electrical signals which are applied to a high speed amplifier 52. The signals passing through the high speed amplifier 50 are applied to a high-speed analog to digital (A/D) converter 52 and the digital output is applied to the microprocessor 40. Preferably, there is a feedback control circuit 54 between the microprocessor and the high-speed amplifier 50 to normalize the amplitude of the amplifier output signals and thereby the amplitude of the A/D converter output signals applied to the microprocessor.

The times that the reflected signals from the two walls 24A and 24B will be received by the sensor 30 are different, because the walls are at different distances LA and LB from the sensor. The distances LA and LB are known from cartridge manufacturing specifications and programmed in the microprocessor. Since the approximate times of reception of the signals from each of the two walls is known, the microprocessor establishes a window at two different reception times for the respective signals reflected from the walls 24A and 24B.

Since the microprocessor knows the time of transmission of the signals by the sensor 30 and it knows the time of reception of the signals reflected from each of the walls 24B and 24A it calculate the two different round-trip transit times tb and ta. The microprocessor also is programmed to calculate the difference ta−tb between the two transit times. Further, having been preprogrammed with the value of the known fixed distance L, the microprocessor can easily calculate the value of the fluid sound velocity V using equation (5).

Typical dimensions for the cartridge and specifications for the electronics are:

| | |
|---|---|
| Overall length of cartridge | 3.0" or less to 12.0" or more |
| Distance LA | 0.55" to 10.0" |
| Distance LB | 0.50" to 10.0" |
| Distance L | 0.05" to 6.0" or more |
| Frequency of signal applied to sensor | 1.0 MHZ to 20.0 MHZ |
| Duration of signal bursts | 100 nanosec to 10 microsec |
| Repetition rate of signal busts | 10 microsec to 20 millisec |

The internal and external dimensions of the cartridge and the frequency and characteristics of the signals are selected to best address the particular application in terms of type of fluid, size of the tubing, etc.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

I claim:

1. Apparatus for measuring the sound velocity of a fluid flowing in a tubing, comprising:
   an elongated cartridge having first and second ends to be placed between ends of the tubing, said cartridge having a hollow internal section formed by first and second chambers of different diameters communicating with said first and second ends and that define first and second walls that extend toward the cartridge longitudinal axis and are spaced apart by a known distance, wherein fluid is to flow into said first end, through said internal section and out through said second end;
   a piezoelectric sensor mounted in said hollow internal section to transmit signal energy to said first and second walls to be reflected back to said sensor;
   a circuit including a microprocessor to control the transmission of the signal energy by said sensor and for computing the round trip transit time of the signal energy transmitted by said sensor to each of said first and second walls and reflected therefrom back to said sensor; wherein
   said microprocessor is programmed with said known distance between said first and second walls and computes the sound velocity of the flowing fluid based on the difference of the two measured round trip transit times and the known fixed distance.

2. The apparatus as claimed in claim 1 wherein said first and second chambers of said cartridge hollow internal section are generally cylindrical.

3. The apparatus as claimed in claim 1 wherein said sensor is mounted at the beginning point of said first chamber adjacent to said cartridge first end.

4. The apparatus as claimed in claim 2 wherein said sensor is of generally toroidal shape.

5. The apparatus as claimed in claim 4 wherein said sensor is mounted at the beginning point of said first chamber adjacent to said cartridge first end.

6. The apparatus as claimed in claim 1 wherein said first and second walls are generally perpendicular to the cartridge longitudinal axis.

7. The apparatus as claimed in claim 1 wherein said microprocessor establishes windows for selective determination of the signal energy reflected from each of said first and second walls back to said sensor.

8. The apparatus as claimed in claim 1 wherein the sound velocity V is calculated according to the formula:

$$V = \frac{2L}{ta - tb}$$

where:
ta is the round trip transit time of the signal from the sensor to said first wall that is the wall most remote from said sensor,
tb is the round trip transit time of the signal from the sensor to said second wall, and
L is the fixed known distance between said first and second walls.

9. Apparatus as claimed in claim 1 wherein said cartridge first end is formed to accept a tubing that supplies the fluid to said cartridge hollow internal section and said second end is formed to accept a tubing through which the fluid exits said cartridge.

10. A method for measuring the sound velocity of a fluid flowing in a tubing, comprising the steps of:
   providing an elongated cartridge having first and second ends communicating with a hollow internal section having first and second chambers of different diameters that define first and second walls that extend toward the cartridge longitudinal axis and are spaced apart by a known distance;
   placing said cartridge between ends of the tubing for fluid to flow into said first end, through said internal section and out through said second end;
   providing a sensor in said hollow internal section to transmit signal energy to said first and second walls to be reflected back to said sensor;
   measuring the round trip transit time of the signal transmitted by said sensor to each of said first and second walls and reflected therefrom back to said sensor; and
   computing the sound velocity of the flowing fluid based on the difference of the two measured round trip transit times and the known fixed distance between said first and second walls.

11. The method as claimed in claim 10 further comprising the step of establishing windows for the selected reception of each of the signals reflected from said first and second walls.

12. The method as claimed in claim 10 wherein the sound velocity V is calculated according to the formula:

$$V = \frac{2L}{ta - tb}$$

where:
ta is the round trip transit time of the signal from the sensor to said first wall that is the wall most remote from said sensor,
tb is the round trip transit time of the signal from the sensor to said second wall, and
L is the fixed known distance between said first and second walls.

13. A cartridge to be used in line of a tubing for use with apparatus for measuring the sound velocity of a fluid flowing in the tubing, the cartridge comprising:
   an elongated body having first and second ends to be placed between ends of the tubing, said body having a hollow internal section formed by first and second chambers of different diameters communicating with said first and second ends and that define first and second walls that extend toward the cartridge longitudinal axis and are spaced apart by a known distance, wherein fluid is to flow into said first end, through said internal section and out through said second end; and
   a piezoelectric sensor mounted in said hollow internal section to transmit signal energy to said first and second walls to be reflected back to said sensor.

14. The cartridge as claimed in claim 13 wherein said first and second chambers of said body hollow internal section are generally cylindrical.

15. The cartridge as claimed in claim 13 wherein said sensor is mounted at the beginning point of said first chamber adjacent to said body first end.

16. The cartridge as claimed in claim 14 wherein said sensor is of generally toroidal shape.

17. The cartridge as claimed in claim 16 wherein said sensor is mounted at the beginning point of said first chamber adjacent to said body first end.

18. The cartridge as claimed in claim 13 wherein said first and second walls are generally perpendicular to the longitudinal axis of said body.

* * * * *